March 26, 1935.  C. HOWELL  1,995,852
WATER CLARIFIER
Filed June 23, 1933   2 Sheets-Sheet 2
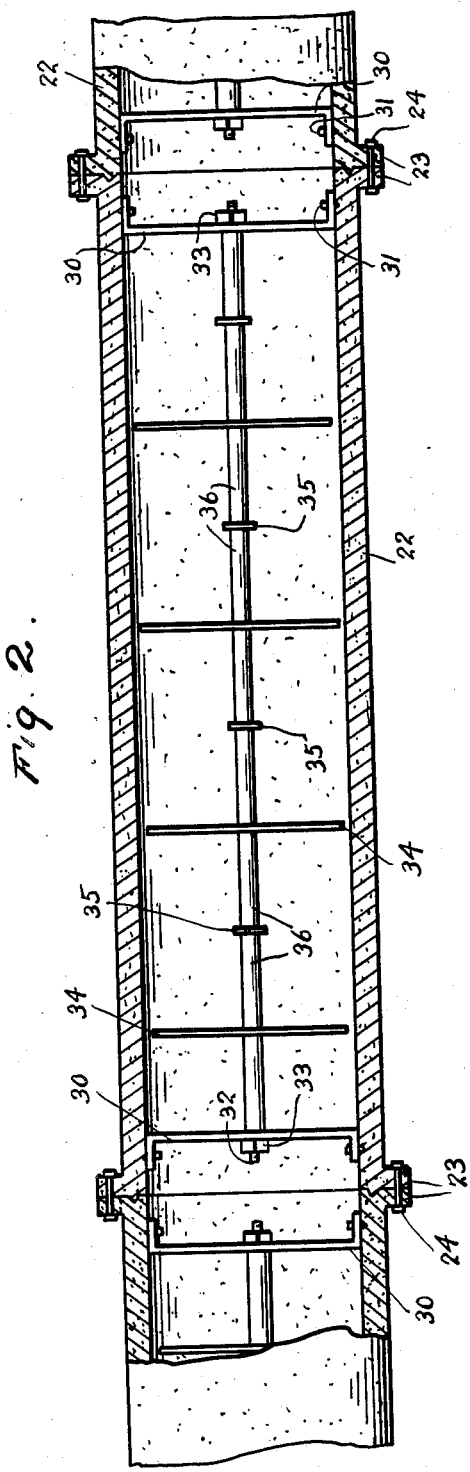
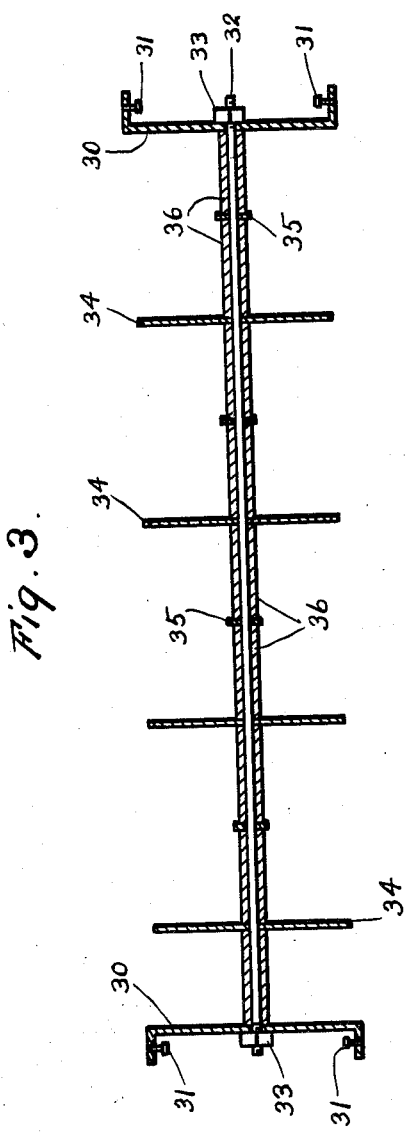
Inventor
Charles Howell
By Clarence A. O'Brien
Attorney Patented Mar. 26, 1935

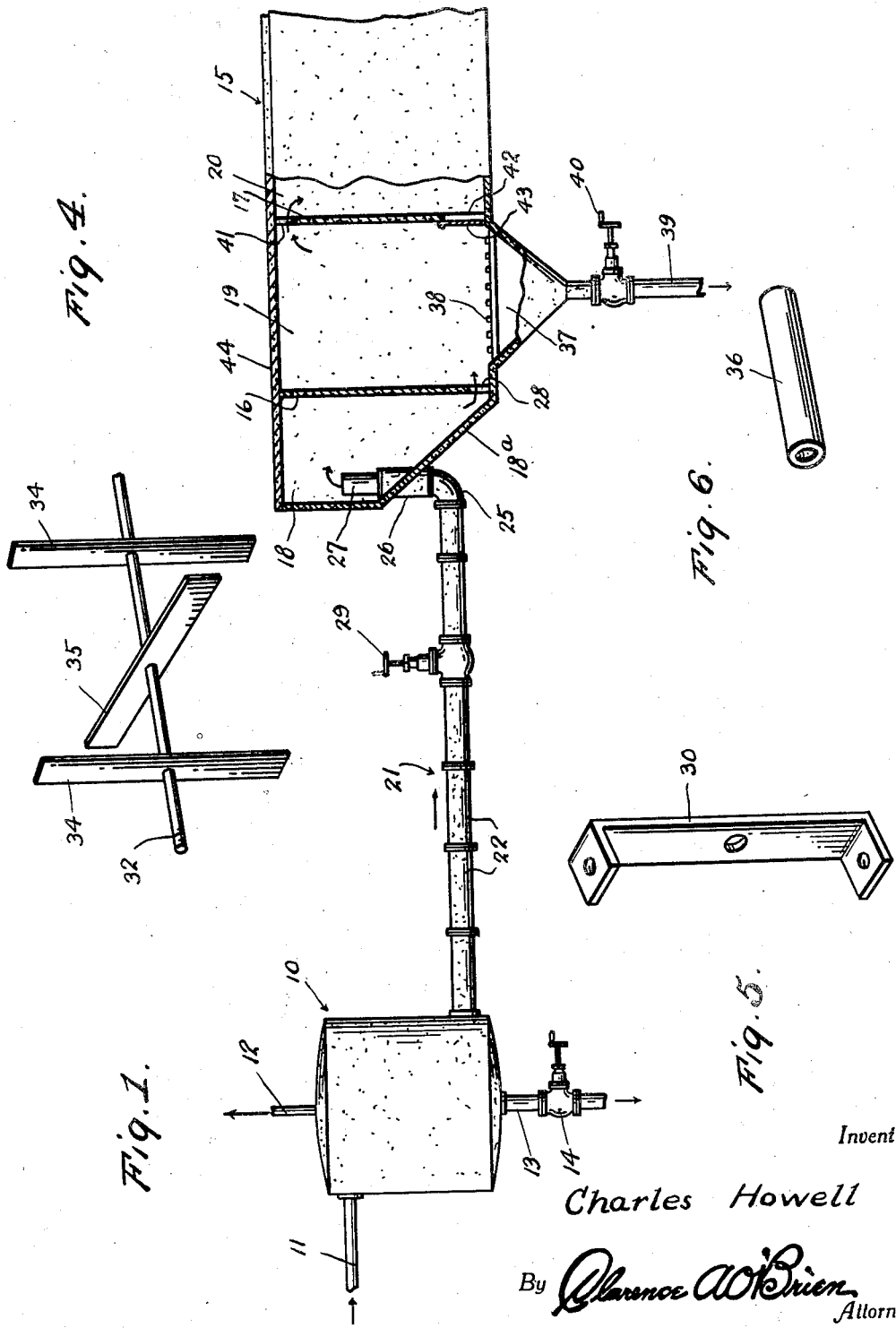

1,995,852

UNITED STATES PATENT OFFICE 1,995,852

WATER CLARIFIER

Charles Howell, Bedford, Ind., assignor of one-tenth to Mabel Erwin Davis, Bedford, Ind.

Application June 23, 1933, Serial No. 677,305

5 Claims. (Cl. 210—16)

This invention relates to apparatus for clarifying water and has as its object the provision of means whereby the clarification of water is improved and rendered more nearly perfect by reason of the fact that the device or apparatus is so provided whereby the chemical is injected at a sufficient distance removed from the first point in the apparatus where the flow of water is first retarded; means being provided in the apparatus for retarding the flow of water at certain points for a predetermined period of time sufficient for a proper chemical action to take place. Further, in accordance with the present invention the apparatus is provided with means for the accumulation of all sediment together with means to permit of frequent and easy flushing and cleansing of the device.

A still further object of the invention is to provide an apparatus of the character above mentioned which will require a materially smaller amount of chemical that is now required by the systems or apparatuses at present used.

It is a further object of the invention to provide an apparatus for the purpose above mentioned which can be economically constructed and maintained and otherwise provide for a material saving in the clarification of water.

The invention together with its numerous objects and advantages will be best understood from a study of the following description, taken in connection with the accompanying drawings wherein:

Figure 1 is a side elevational view of the apparatus, certain parts being broken away and shown in section.

Figure 2 is a partial view of a conduit, certain parts thereof being broken away and shown in section.

Figure 3 is a sectional view of a stationary agitator to be hereinafter more fully referred to.

Figure 4 is a perspective view of a portion of the stationary agitator showing the angular relation of the plate forming part of the agitator.

Figure 5 is a perspective view of an end or supporting bar forming part of the agitator and Figure 6 is a perspective view of a spacer sleeve.

Referring to the drawings by reference numerals it will be seen that the apparatus comprises a tank 10 to which the water to be clarified is fed through a pipe 11, and in the contemplation of the invention the chemical to be used in the clarification of the water is injected into the pipe 11 at a point remote from the tank 10 sufficient to require approximately one and one-half minutes for the water with the chemical cleansing agent carried thereby to travel from the point of injection to the tank 10 where the first retardation in the flow of the water occurs. As shown tank 10 is provided in the top thereof with a vent tube 12 and in the bottom with a drain tube 13 provided with a valve 14. Placed at a point considerably remote from the tank 10 is a casing or tank indicated generally by the reference numeral 15. As shown, the tank or casing 15 is divided by partitions 16, 17 into a receiving chamber 18, a separating chamber 19, and a storage chamber 20. The receiving chamber 18 as noted is smaller than the chamber 19, the latter chamber is smaller than the storage chamber 20, the object being to provide for the consumation of a time period of about thirty minutes before the water entering the chamber 18 empties into the storage chamber 20. In this connection it is explained that the size of chamber 18 is such as to hold the water therein for a period of approximately ten minutes, while the size of the chamber 19 is such as to hold the water therein for a period approximating twenty minutes. The receiving chamber 18 is connected with the outlet side of the tank 10 through the medium of a sectional conduit 21. Conduit 21 as shown in the drawings comprises any desired number of concrete tubular or pipe sections 22, preferably of concrete and provided at their meeting ends with flanges 23 where they are joined together through the medium of bolts 24.

At one end the conduit 21 is connected through the medium of an elbow 25 with coupling 26 that extends through the inclined bottom 18a of the chamber 18 in the upper portion of said bottom. On the inner end of the coupling 18 is a short pipe section 27 and as is apparent the water from the tank 10 flows through the conduit 21 and empties into the chamber 18, to pass from the chamber 18 through ports 28 in the lower part of the partition 16, into the chamber 19. In the conduit 21 there is also provided a control valve 29.

Arranged within each section 22 of the conduit 21 is an agitator which in the present instance comprises a pair of end or supporting plates 30 provided at their respective ends with flanges whereby they are secured to the walls of a section 22 through the medium of suitable fastening elements 31. A rod 32 has the ends thereof extending through apertures provided intermediate the ends of the plates 30 and nuts 33 on the threaded ends of the rod. Arranged at spaced intervals on the rod 32 are vertical and horizontal plates 34, 35 arranged in alternate relation throughout the length of the rod as will be clear from a study of Figures 3 and 4. The plates 34, 35 are secured in spaced relation through the medium of spacer sleeves 36. The plates 34, 35 provide baffles against which the water flowing through the conduit impinges so that there will be a thorough agitation of the flowing water for the purpose of insuring a thorough commingling of the water and the chemical.

Provided in the bottom of the chamber 19 is a sediment pit 37 and across the top of the pit is a grate 38, the purpose of which is to prevent the current from agitating the sediment that settles in the pit 37. A drain 39 is provided for the pit, and said drain is equipped with a valve 40.

As is thought apparent the sediment in the water passing from the chamber 18 into the chamber 19 settles in the pit 37 and as the water rises in the chamber 19 it overflows into the storage chamber 20 through ports 41 provided in the upper portion of the partition 17. Thus it will be seen that the water from the chamber 18 to the storage chamber 20 moves in a tortuous course, and this arrangement of chambers together with the tank 10 also provides for a tortuous passage of the water from the time the chemical is injected thereto until the clarified water spills into the storage tank 20, this tortuous passage for the water obviously retarding the flow thereof thus giving the chemicals ample opportunity to work in the clarifying process.

Any sediment that may accumulate in the storage chamber 20 may be washed therefrom into the sediment trap or pit 37 through a clean-out opening 42 provided in the lower portion of the partition 17. Controlling the opening 42 is a gate valve 43 that is hinged at its upper end for vertical swinging movement, and as will be noted from a study of Figure 1 the valve 43 opens inwardly of the chamber 19. In actual practice and as thought clear from the foregoing, the water to be clarified passes through the conduit 11 and at a suitable point in the conduit remote from the tank 10 a chemical is injected into the water. From the conduit 11 the chemically laden water discharges into the tank 10 where the first retardation in the flow of the water takes place, and from the tank 10 the water passes through the conduit 21 into the chamber 18 where the second retardation of the water takes place. From the chamber 18 the water flows into the tank 19 where the third and final retardation of the water takes place. Within the tank 19 the sediment in the water settles in the pit 37 and water free of all sediment passes from the tank 19 into the storage chamber 20 in a clarified condition for use. Obviously the flow of water from the conduit 21, into the chamber 18 is regulated by the valve 29.

In the preferred construction thereof the tank or casing 15 and the partitions 16, 17 are constructed from concrete. The chambers 18, 19 and 20 are open at the top of the casing and a concrete closure or lid 44, common to the compartment or chambers is provided for the top of the casing 15.

While I have herein shown and described the preferred embodiment of the invention it is to be understood that it is in no wise intended to restrict the invention to the precise details of construction, combination and arrangement of elements as herein illustrated and described, other than may be necessary to meet the requirements of the prior art and scope of the appended claims.

Having thus described my invention, what I claim as new is:

1. An apparatus for clarifying water comprising a tank for receiving the water subsequent to the injection of a clarifying agent in the water, a series of integral chambers varying as to one another in capacity remote from said tank and through which the water is constrained to successively travel and including a receiving chamber, a conduit connecting the receiving chamber with the tank, an intermediate chamber receiving the water from the receiving chamber at the bottom of the said chamber, and a reservoir chamber receiving the water from the intermediate chamber at the tops of said intermediate and reservoir chambers, and a series of baffles in said conduit for agitating the water passing from the tank to the receiving chamber, alternate baffles being arranged vertically and intermediate baffles being arranged substantially horizontally.

2. An apparatus for clarifying water comprising a tank for receiving the water subsequent to the injection of a clarifying agent in the water, a series of chambers remote from said tank and through which the water is constrained to successively travel and including a receiving chamber, a conduit connecting the receiving chamber with the tank, an intermediate chamber receiving the water from the receiving chamber at the bottom of the said chamber, and a reservoir chamber receiving the water from the intermediate chamber at the tops of said intermediate and reservoir chambers, a series of baffles, including vertically arranged alternate baffles and horizontally arranged intermediate baffles in said conduit for agitating the water passing from the tank to the receiving chamber, a sediment pit in the bottom of said intermediate chamber, and valved drain means for said pit.

3. An apparatus for clarifying water without resort to sand, driven elements, and driving means for the driven elements, and comprising a unitary structure consisting of an elongated tank, spaced vertical partitions in the tank dividing the same into a receiving chamber, a separating chamber and a storage chamber, said receiving chamber being arranged at one end of the tank, said storage chamber being arranged at a relatively opposite end of the tank, and the separating chamber being arranged intermediate the receiving and storage chambers; and said tank having the bottom wall thereof at the receiving chamber end of the tank terminating short of the end of the tank with the end wall of the tank at the last named end thereof having its lower portion disposed at an incline; said tank having the bottom wall thereof forming the bottom of the separating chamber provided with an opening and having an integral substantially conical projection depending therefrom and providing a sediment pit having an outlet in the bottom thereof, a grate in the bottom of the separating chamber disposed across said opening and conduit means connected with the inclined portion of said end wall of the tank and terminating inwardly of the receiving chamber for conducting chemically treated water to the receiving chamber for passage through the successive chambers into the storage chamber, the partition separating the receiving and separating chambers being provided with an opening in the bottom thereof communicating said chambers, and the partition between said separating and storage chambers being provided with an opening in the top thereof communicating said chambers whereby to provide for a tortuous flow of water from the receiving chamber to the storage chamber.

4. In a water clarifier, a tank, vertical partitions arranged in the tank in spaced relation and dividing the same into chambers successively increasing in capacity from one end to the other of the tank with the chamber of smallest capacity constituting a receiving chamber, the chamber of largest capacity constituting a storage chamber, and the third chamber being arranged between the first two chambers and having a capacity exceeding that of the receiving chamber and less than that of the storage chamber, with the third chamber constituting a separating chamber, and the partition between the receiving and separating chambers being provided with an opening adjacent the bottom thereof, and the other of the partitions being provided with an opening adjacent the top thereof so that the chemically treated water will pass from the receiving chamber into the separating chamber at the bottom of the latter, and from the separating chamber to the storage chamber at the top of the separating chamber.

5. In a water clarifier a conduit for the chemically treated water and having a baffle structure arranged therein comprising a rod extending longitudinally of the conduit and a series of longitudinally spaced narrow elongated baffle plates mounted on the rod and extending diametrically of the conduits, alternate baffle plates being arranged vertically, and intermediate baffle plates being arranged substantially horizontally.

CHARLES HOWELL.